D. GORMAN.
Potato Digger.

No. 95,896. Patented Oct. 19, 1869.

Witnesses.
Chas. H. Poole
D. R. Cowl

Inventor.
Dennis Gorman
By J. B. Wooster
Attorneys

United States Patent Office.

DENNIS GORMAN, OF HORNELLSVILLE, NEW YORK.

Letters Patent No. 95,896, dated October 19, 1869.

IMPROVEMENT IN POTATO-DIGGER.

The Schedule referred to in these Letters Patent and making part of the same.

*To all whom it may concern:*

Be it known that I, DENNIS GORMAN, of Hornellsville, in the county of Steuben, and State of New York, have invented certain new and useful Improvements in Potato-Diggers and Separators, to be operated or worked by horse-power; and the following is a full, clear, and exact description of the same, reference being had to the accompanying drawings, making a part of this specification, in which—

Figure 1:
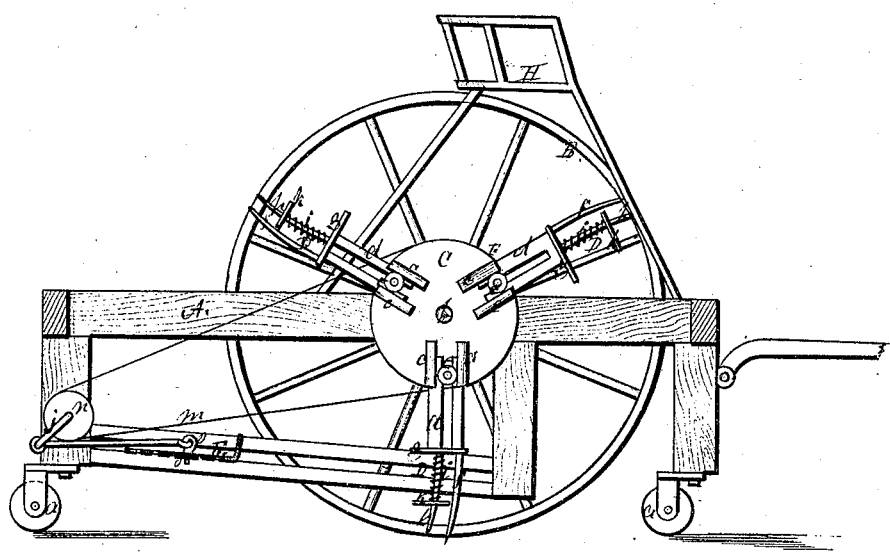
Figure 1 represents a sectional side elevation of my improved implement or machine, showing the operating-parts.
Figure 2:
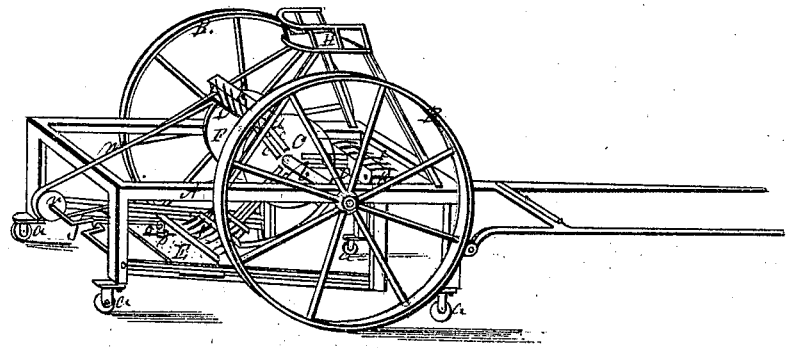
Figure 2 shows a perspective view of the whole apparatus for taking the potatoes from the hills, lifting them on to the screen for cleaning and spreading them in the rear for drying.

My invention consists in the peculiar construction of the digging-fork scoops, or the potato-lifting apparatus, and their arrangement and adjustability on a revolving disk, in combination with the reciprocating screen for cleaning, while the scoop or fork liberates itself from the vines.

To enable others to make and use my invention, I will describe it more fully, referring to the drawings, and to the letters of reference thereon.

The frame A may be made of wood or metal, in such form as is most convenient, to attach the working parts, and kept steady by caster-rollers, $a\ a\ a\ a$, at the four corners, when in operation, they following the smooth furrows between the rows of hills; the frame A being mounted and mainly supported on the large driving-wheels B B on both sides of the frame, they being secured to the ends of the revolving axle $b$, in the centre of which is a disk-wheel, C, that is provided with three sets of guides, $c\ c$, into which are the shanks $d\ d$ fitted to slide, to be adjusted and secured by bolts and nuts $e\ e\ e$, on which the scoops or diggers D D D are fastened, to do their work.

The scoops D are made of metal plates, $g$, into which is securely fastened a series of prongs, $f\ f\ f$, of sufficient number to get the required width of the diggers, on the rear edge; and on each end of the plate $g$ is a similar prong, $h\ h$, around which are coiled a helical spring, $i\ i$, and a sliding plate, $k$, which yields to the pressure of the earth as the prongs enter it, to take under the hill of potatoes and lift them out of the ground, and elevate them on to the screen E, where they are shaken and cleaned from the dirt and vines by the action of the crank $j$ in the rear, which is driven by the pulley $n$, belt $m$, and large pulley F, on the main driving-shaft or axle $b$.

The diggers or scoops D D D are made so as to be adjusted to any desired depth, and the screen E is also provided with a slot, $o$, bolt and set-screw, $p$, so as to be adjusted to conform to the diggers.

The driver's seat H is mounted on the front end of the frame A, above the revolving scoops, a sufficient height to allow them to pass under it.

What I claim as my invention, and desire to secure by Letters Patent, is—

The digging-fork scoops D D D as constructed and arranged on the revolving disk C for adjusting their depth, in combination with the screen E, operating in the manner substantially as herein described, for the purposes set forth.

In testimony whereof, I hereunto subscribe my name, in the presence of—

DENNIS GORMAN.

Witnesses:
 MILES W. HAWLEY,
 B. C. DEWITT.